Figure 1:
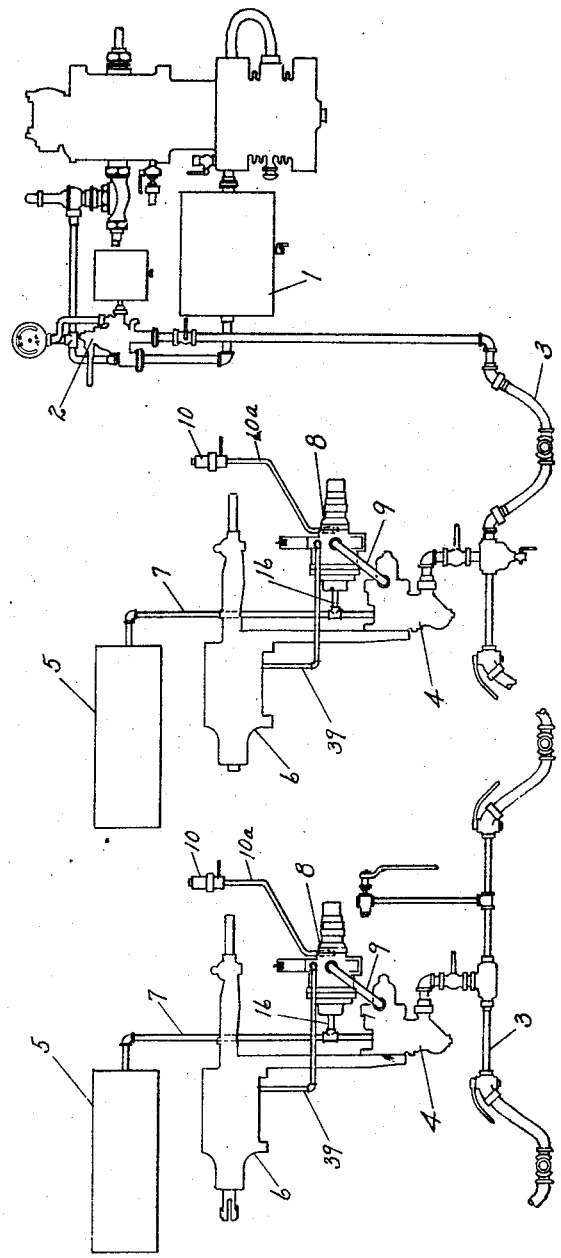

Aug. 4, 1925.

A. W. NICHOLSON 1,548,163

RETAINING VALVE FOR AIR BRAKE SYSTEMS

Filed May 3, 1924    3 Sheets-Sheet 2

INVENTOR
Alexander W. Nicholson
by William B. Wharton
his attorney

Aug. 4, 1925.　　　　　　　　　　　　　　　　　1,548,163
A. W. NICHOLSON
RETAINING VALVE FOR AIR BRAKE SYSTEMS
Filed May 3, 1924　　　　3 Sheets-Sheet 3

INVENTOR
Alexander W. Nicholson
by William B. Wharton
his attorney

Patented Aug. 4, 1925.

1,548,163

UNITED STATES PATENT OFFICE.

ALEXANDER W. NICHOLSON, OF MILL RUN, PENNSYLVANIA.

RETAINING VALVE FOR AIR-BRAKE SYSTEMS.

Application filed May 3, 1924. Serial No. 710,858.

*To all whom it may concern:*

Be it known that I, ALEXANDER W. NICHOLSON, a citizen of the United States, residing at Mill Run, in the county of Fayette and State of Pennsylvania, have invented a new and useful Improvement in a Retaining Valve for Air-Brake Systems, of which the following is a specification.

This invention relates to an automatic retaining valve for use as an element in air brake systems.

As is well known, the application of air brakes is obtained by the overbalancing of train pipe pressure by the pressure in the several auxiliary reservoirs of the various cars comprising a train. It is also well known that the auxiliary reservoirs cannot be recharged during a service application of the brakes, which is effected by a reduction of train pipe pressure below that of the auxiliary reservoir.

It is a fact that in long continued service applications of the brakes, as in descending a long down grade, air tends to leak through the triple valve to the exhaust side thereof. This gradually reduces the auxiliary reservoir pressure and destroys the preponderance of auxiliary reservoir pressure over train pipe pressure.

In order to continue the application of the brakes it is then necessary to effect a further reduction in train pipe pressure in order that the auxiliary reservoir pressure may predominate. Such continued "bleeding off" is highly dangerous, as on a long grade it may result in finally causing train pipe pressure to approach atmospheric pressure, in which event no further reduction is possible to restore the preponderance of auxiliary reservoir pressure and continue the application of the brakes.

In order to conserve auxiliary reservoir pressure, and avoid undue reduction of train pipe pressure, a retaining valve has been connected to the exhaust side of the triple valve. Such retaining valves, however, have previously been operable manually in order to render them effective in preventing leakage of auxiliary reservoir pressure, it being necessary to operate independently the retaining valve for each car of a train.

One object of the present invention is to provide a retaining valve which may be automatically actuated in order to prevent or permit the exhausting of pressure through the triple valve.

Another object of the present invention is to provide an automatic retaining valve operable in such manner that the retaining valves on all the cars of a train are under the control of the engineer, and may be simultaneously operated by him.

A further object of the invention is to provide means in connection with such retaining valve whereby one valve may be placed in exhaust position to bleed off the brakes of the car to which it is applied, without affecting the condition of the retaining valves on other cars of the train.

Figure 2:
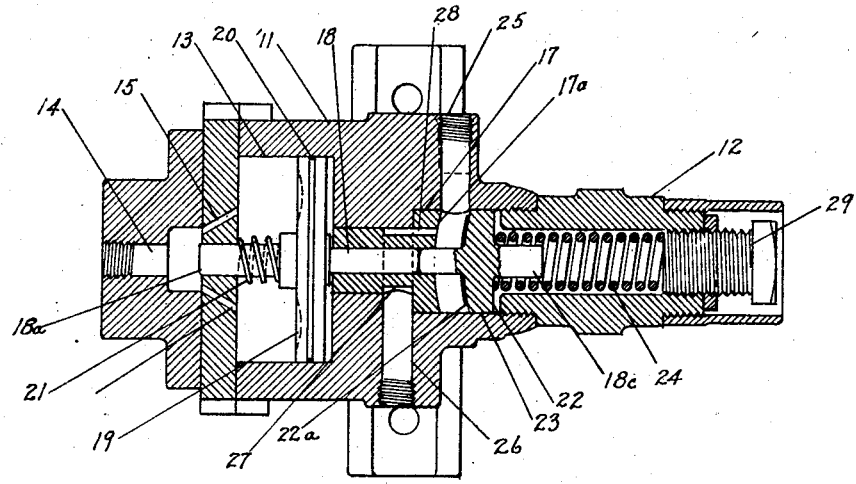
Figure 3:
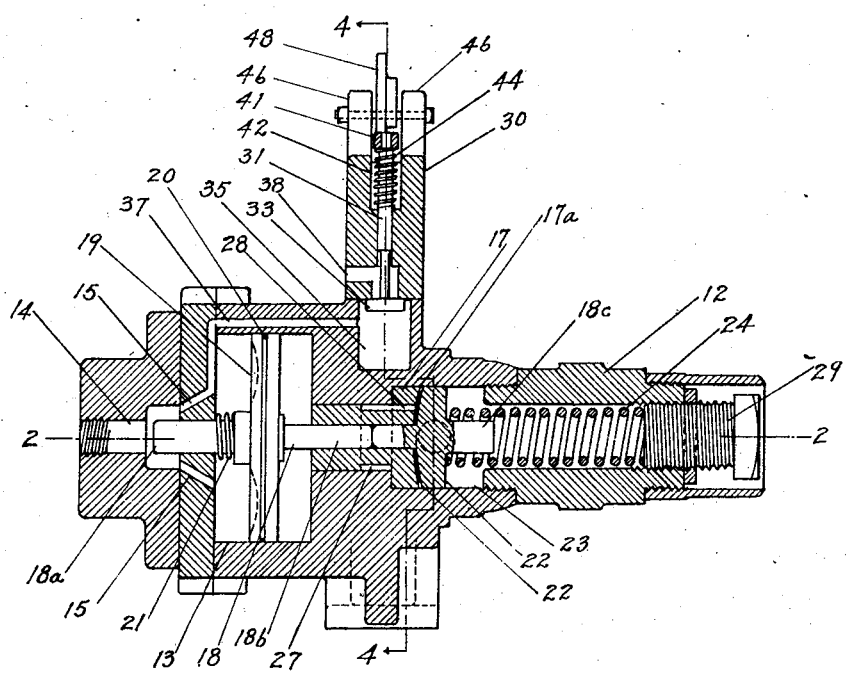
Figure 4:
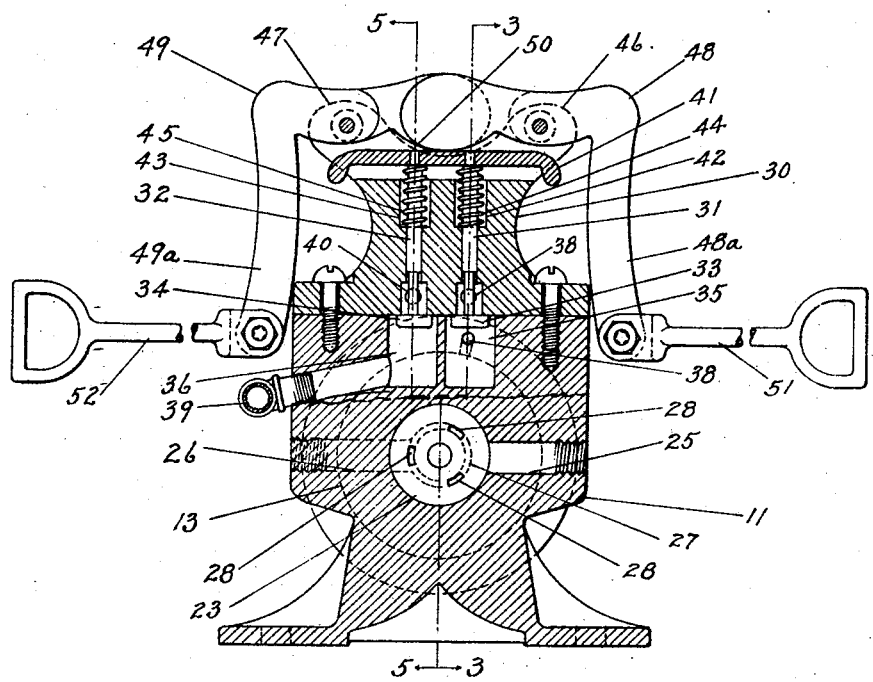
Figure 5:
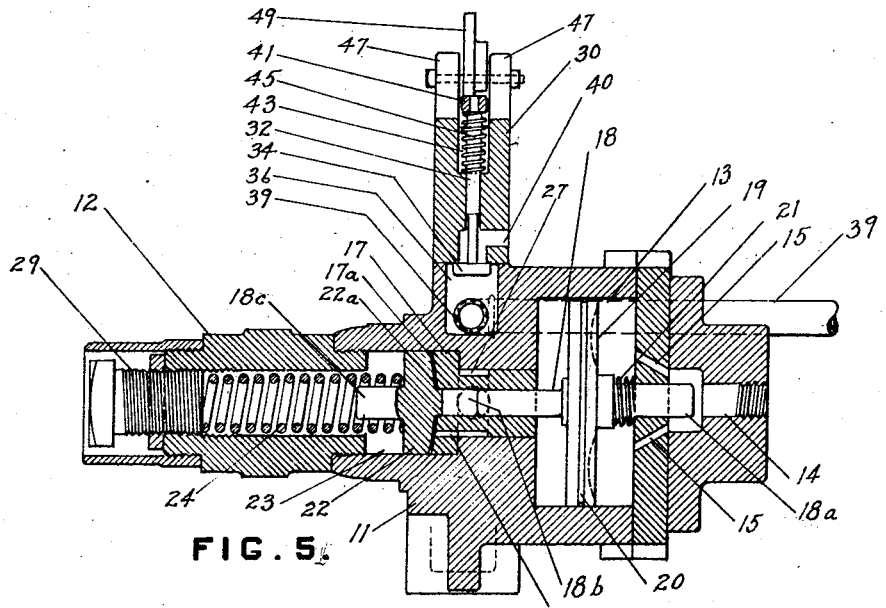

In the accompanying drawings, Figure 1 is a diagrammatic elevation of a portion of an air brake system of standard type, showing the retaining valve of the present invention applied to each assembly of car equipment shown; Figure 2 is a horizontal sectional view of the valve, taken on the line 2—2 Figure 3; Figure 3 is a vertical sectional view, taken on the line 3—3 of Figure 4; Figure 4 is a cross sectional view, taken on the line 4—4 of Figure 3; and Figure 5 is a vertical sectional view taken on the line 5—5 of Figure 4.

In Figure 1 of the drawings the reference numeral 1 designates the main air tank of the system, 2 the engineer's valve, and 3 the train pipe of the system. Connected with the train pipe are the triple valves 4 of the equipment for two cars, auxiliary reservoirs 5 and brake cylinders 6. The auxiliary reservoirs are connected to the triple valves by means of conduits 7. The pressure retaining valves 8 are connected in the exhaust lines 9 from the triple valve 4, and in communication with the atmosphere, as shown, by way of choke valve 10 connected to the exhaust side of the retaining valve by a conduit 10$^a$.

The retaining valve comprises a main body portion 11, and a tubular spring housing 12. In the main body portion 11 is a cylindrical bore 13, to which lead a main duct 14 and branch ducts 15. As shown in Figure 1, a short conduit 16 connects duct 14 with the conduit 7 leading from the auxiliary reservoir 5.

In a bore of smaller diameter in the main body portion 11 of the valve is a valve seat member or plug 17, which is secured in position and has a longitudinal bore through which passes a two piece stem 18, comprising the portions 18ª and 18ᵇ.

Secured on stem 18ª is a piston 19, which has a tight sliding fit in the bore 13 and which is provided with a peripherally disposed oil groove 20. A light seating spring 21 surrounds the stem 18ª, and bears against the piston 19 and the inner wall of the body portion 11.

On stem 18ᵇ and integral therewith is a valve member 22, which has a tight sliding fit in a bore 23 in the main body portion. Surrounding a short stem portion 18ᶜ, which extends beyond valve member 22, is a coiled spring 24 bearing against the outer face of the valve member 22. The inner face 22ª of the valve member fits closely against the face 17ª of the valve seat 17.

Extending into the main body member 11 is an exhaust duct 25, which is in communication with the exhaust conduit 10ª, and a duct 26, which connects with the exhaust line 9 from the triple valve. The duct 26 opens into an annular space 27 formed by the spool shaped plug or valve seat member 17. As shown in Figure 2, the ducts 25 and 26 are in communication by way of the annular space 27 and ports 28 extending through the seat member 17 and opening at the face 17ª thereof.

The tension of spring 24, and the force which it exerts tending to seat the valve 22, may be regulated by means of an adjusting bolt 29 in the extremity of the spring housing 12.

With the retaining valve of the present invention in an air brake system, the tension of the spring 24 may be adjusted to counterbalance a certain pressure in the train pipe and auxiliary reservoir, for example, a pressure of seventy-two pounds. When, therefore, the engineer reduces train pipe pressure to a point of seventy pounds or less, and auxiliary reservoir pressure is accordingly reduced by the withdrawal of air therefrom to the brake cylinder spring 24 acts to seat the valve 22.

With the triple valve in running position, and auxiliary reservoir pressure preponderating over the force exerted by spring 24, auxiliary reservoir pressure, acts on the outer face of piston 19 to force the piston inwardly. The piston is thus maintained in the position shown in Figure 2 of the drawings. In this position valve 22 is forced from its seat, as shown. Communication is thus established to the exhaust port of the triple valve to exhaust the brake cylinder to the atmosphere through duct 26, annular space 27, ports 28, duct 25, exhaust conduit 10ª, and choke valve 10.

Upon a reduction in brake cylinder pressure, auxiliary reservoir pressure is also slightly reduced during the operation of the triple valve and the initial application of the brakes. This causes the force exerted by the spring 24 to exceed the force exerted by auxiliary reservoir pressure on the outer face of the piston 19. The pressure exerted by spring 24 accordingly acts to seat the valve member 22, and to maintain its face 22ª in close engagement with the face 17ª of the valve seat 17.

In this position of the elements the ports 28 through valve seat 17 are blanked, and communication between the triple valve duct 26 and the exhaust duct 25 is cut off.

In this service position any leakage of pressure from the brake cylinder and auxiliary reservoir is prevented, and auxiliary reservoir pressure is therefore conserved. As there is no tendency toward the exhaustion of auxiliary reservoir pressure, there is no necessity for further reduction of train pipe pressure.

When it is desired to release the brakes throughout the train, the engineer as usual, operates his valve to increase train pipe pressure above auxiliary reservoir pressure. This increase of train pipe pressure moves the operating parts of the triple valve to running and charging position, and admits additional pressure to the auxiliary reservoir.

Such increase in auxiliary reservoir pressure causes the piston 19 to move against the resistance of spring 24 to unseat the valve 22. Brake cylinder pressure is thus exhausted to release the brakes, by way of the triple valve, exhaust line 9, port 26, space 27, port 25, exhaust conduit 10ª, and choke valve 10.

It will be observed that the brake cylinder pressure cannot bleed away through the triple valve. It will also be observed that any slight leakage of brake cylinder pressure does not tend to further leakage, but on the contrary serves to increase the preponderance of the force tending to seat the valve member which closes communication through the retaining valve.

The elements of the device so far described are effective in the normal operation of the valve. It frequently happens, however, that a car is to be "kicked" or shunted off. In such event it is necessary to release the brakes on the end car of the train, while applying the brakes throughout the remainder of the train. Means are therefore provided for the release of brake cylinder and auxiliary reservoir pressure which may be individually and manually operated on each car of a train.

Such means comprise a body member 30, which is bolted, or otherwise suitably secured, to the main body portion 11 of the valve. Extending through this member 30 are push rods 31 and 32, which respectively carry the valves 33 and 34 seating in the chambers 35 and 36. Chamber 35 is in communication with the auxiliary reservoir by way of a duct 37 leading from the main duct 14 which places the bore 13 of the main body portion in communication with the auxiliary reservoir. A duct 38, controlled by the valve 33, places the chamber 35 in communication with the atmosphere.

Chamber 36 is in direct communication with the brake cylinder by way of a duct or conduit 39. A duct 40, controlled by the valve 34, leads from chamber 36 to the atmosphere.

The upper extremities of the push rods 31 and 32 extend above the top of the body member 30, and are secured to a plate 41 disposed above the body member. In seats 42 and 43 in the member 11 are coiled springs 44 and 45 which surround the push rods 31 and 32 and bear against the plate 41. Pivotally mounted between pairs of lugs 46 and 47, which extend upwardly from member 30, are arms 48 and 49. Each of these arms terminates in a cam portion 50, which bears against the upper surface of the plate 41. To the depending portions 48ᵃ and 49ᵃ of the arms are connected operating arms 51 and 52.

When it is desired to release the brakes on any car, without releasing the brakes throughout the train by an increase in train pipe pressure, the operation of either of the arms 48 or 49 causes the cam portion of such rod to bear downwardly upon the plate 41 to depress the push rods 31 and 32 against the resistance of the coiled springs 44 and 45. Such action unseats the valves 33 and 34 simultaneously. Auxiliary reservoir pressure may thus escape to the atmosphere by way of duct 14, duct 37, chamber 35, and duct 38. Simultaneously the brake cylinder pressure is exhausted, to secure a quick release of the brakes by way of duct 40, chamber 36, and the other connections establishing communication with the triple valve.

It will be readily understood that the retaining valve of the present invention conserves and economizes brake cylinder and auxiliary reservoir pressure during a long continued application of the brakes. It also presents the further advantage that the parts are simple, and that there is little danger of a failure of the valve to operate because of sticking of the valve members or to in any way impair the action of the brakes.

What I claim is:

1. In an air brake system an automatic retaining valve arranged to be connected with the exhaust port of a triple valve, said retaining valve being provided with intercommunicating ports and passages for placing the triple valve in communication with the atmosphere, and movable means in said valve arranged to control communication by way of said ports and passages.

2. In an air brake system an automatic retaining valve arranged to be connected with the exhaust port of a triple valve, said retaining valve being provided with intercommunicating ports and passages leading to the atmosphere, movable means in said valve for cutting off communication between said ports and passages, and yielding means for maintaining said movable means in position to cut off communication by way of said ports and passages.

3. In an air brake system an automatic retaining valve arranged to be connected with the exhaust port of a triple valve, said retaining valve being provided with intercommunicating ports and passages leading to the atmosphere, a movable closure member in said valve, and means arranged to act against auxiliary reservoir pressure for maintaining said movable means in position to cut off communication between said ports and passages.

4. In an air brake system an automatic retaining valve arranged to be connected with the exhaust port of a triple valve, said retaining valve being provided with intercommunicating ports and passages for placing the triple valve in communication with the atmosphere, and movable means arranged to be forced into position to cut off communication by way of said ports and passages.

5. In an air brake system an automatic retaining valve arranged to be connected with the exhaust port of a triple valve, said retaining valve being provided with intercommunicating ports and passages for placing the triple valve in communication with the atmosphere, movable means arranged to be forced into position to cut off communication by way of said ports and passages, and means operable by auxiliary reservoir pressure for operating said movable means to establish communication by way of said ports and passages.

6. In an air brake system an automatic retaining valve arranged to be connected with the exhaust port of a triple valve, said retaining valve being provided with intercommunicating ports and passages for placing the triple valve in communication with the atmosphere, and movable means in said valve arranged to permit communication by way of said ports and passages when auxiliary reservoir pressure exceeds a predetermined point and to cut off communication when auxiliary reservoir pressure falls below such point.

7. In an air brake system an automatic retaining valve arranged to be connected with the exhaust port of a triple valve, said retaining valve being provided with intercommunicating ports and passages for placing the triple valve in communication with the atmosphere, and a movable closure member arranged to be acted upon by auxiliary reservoir pressure for controlling communication by way of said ports and passages.

8. In an air brake system an automatic retaining valve arranged to be connected with the exhaust port of a triple valve, said retaining valve being provided with intercommunicating ports and passages for placing the triple valve in communication with the atmosphere, a movable closure member for controlling communication by way of said ports and passages and arranged to be acted upon by auxiliary reservoir pressure, and yielding means arranged to act against auxiliary reservoir pressure on said member.

9. In an air brake system an automatic retaining valve arranged to be connected with the exhaust port of a triple valve, said retaining valve being provided with intercommunicating ports and passages for placing the triple valve in communication with the atmosphere, a movable closure member for controlling communication by way of said ports and passages, yielding means acting to move said member in one direction, and a piston acted upon by auxiliary reservoir pressure arranged to act against the force exerted by said yielding means.

10. In an air brake system an automatic retaining valve in communication with the exhaust port of a triple valve and having independent communication with the auxiliary reservoir of the system, said valve being arranged to vent the triple valve to the atmosphere upon excess of auxiliary reservoir pressure above a predetermined point.

11. In an air brake system an automatic retaining valve in communication with the exhaust port of a triple valve and having independent communication with the auxiliary reservoir of the system, said valve being arranged to act under auxiliary reservoir pressure to vent the triple valve to the atmosphere, and means arranged to act against auxiliary reservoir pressure to counterbalance such pressure up to a predetermined point.

12. In an air brake system an automatic pressure retaining valve in communication with the exhaust port of a triple valve and having independent communication with the auxiliary reservoir of the system, said valve being arranged to act under auxiliary reservoir pressure to vent the triple valve to the atmosphere, means arranged to act against auxiliary reservoir pressure to counterbalance the same up to a predetermined point, and means for regulating the counterbalancing effect of such means.

13. In an air brake system an automatic pressure retaining valve in communication with the exhaust port of a triple valve and having independent communication with the auxiliary reservoir of the system, said valve being arranged to act under auxiliary reservoir pressure to vent the triple valve to the atmosphere, and yielding means arranged to oppose the effect of auxiliary reservoir pressure on the valve.

14. In an air brake system an automatic pressure retaining valve in communication with the exhaust port of a triple valve and having independent communication with the auxiliary reservoir of the system, said valve being arranged to act under auxiliary reservoir pressure to vent the triple valve to the atmosphere, yielding means arranged to oppose the effect of auxiliary reservoir pressure on the valve, and means for regulating the force with which such yielding means oppose auxiliary reservoir pressure.

15. In an air brake system retaining and release valve having an automatic retaining valve structure in communication with the exhaust port of a triple valve and in communication with the auxiliary reservoir of the system, said valve being arranged to vent the triple valve to the atmosphere upon excess of auxiliary reservoir pressure above a predetermined point, and independently operable valve means in direct communication with the brake cylinder of the system and in communication with the auxiliary reservoir thereof.

16. In an air brake system retaining and release valve having an automatic retaining valve structure in communication with the exhaust port of a triple valve and in independent communication with the auxiliary reservoir of the system, said valve being arranged to vent the triple valve to the atmosphere upon excess of auxiliary reservoir pressure above a predetermined point, and independently operable valve means in direct communication with the brake cylinder of the system and in communication with the auxiliary reservoir by way of passages in the automatic retaining valve structure.

17. In an air brake system comprising an auxiliary reservoir and brake cylinder a release valve in communication with the auxiliary reservoir and brake cylinder, and means for operating said valve to vent the auxiliary reservoir and brake cylinder to the atmosphere.

18. In an air brake system comprising an auxiliary reservoir and brake cylinder a release valve in communication with the auxiliary reservoir and brake cylinder, said valve comprising a body member having therein separate passages leading to the atmosphere, closure members controlling said passages, and means for simultaneously operating said members to simultaneously vent the auxiliary reservoir and brake cylinder.

19. In an air brake system comprising an auxiliary reservoir and brake cylinder a release valve in communication with the auxiliary reservoir and brake cylinder, said valve comprising a body member having therein separate passages leading to the atmosphere, closure members controlling said passages, and a cam arranged to operate both of said closure members simultaneously to simultaneously vent the auxiliary reservoir and brake cylinder.

In witness whereof, I hereunto set my hand.

ALEXANDER W. NICHOLSON.

Witnesses:
  W. E. BALLARD,
  E. B. WALTERS.